Aug. 3, 1926.
C. J. WHITACRE
CLUTCH PLATE
Filed May 19, 1924
1,594,438
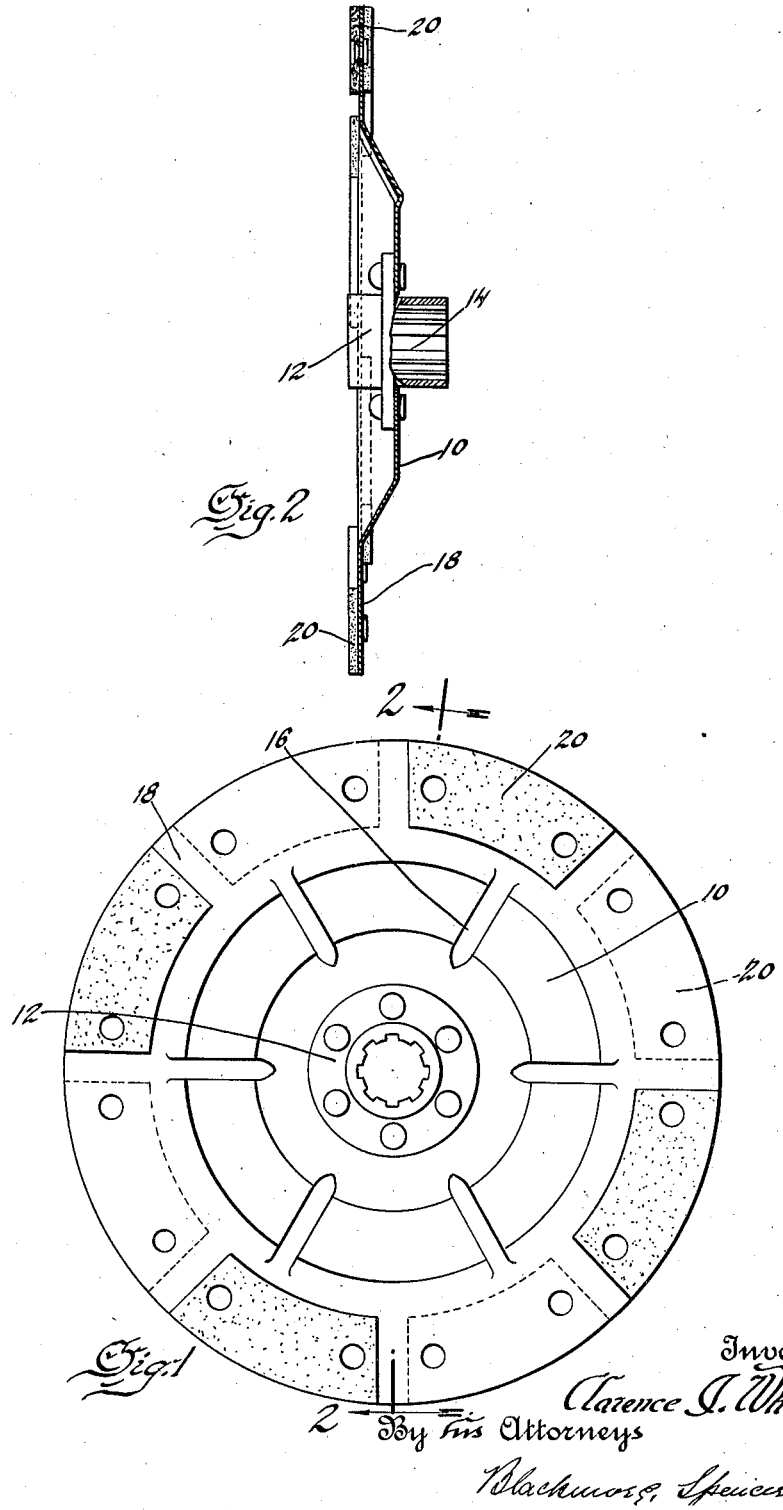

Patented Aug. 3, 1926.

1,594,438

UNITED STATES PATENT OFFICE.

CLARENCE J. WHITACRE, OF FLINT, MICHIGAN.

CLUTCH PLATE.

Application filed May 19, 1924. Serial No. 714,413.

This invention relates to clutches, and is illustrated as embodied in a driven plate for a plate clutch. An object of the invention is to provide a strong but elastic plate faced with half the usual amount of clutch material, and which has an unbroken circular periphery so that there is practically no tendency toward a "set" or permanent distortion in use. In the preferred embodiment, a solid plate,—i. e. a plate having an unbroken periphery is faced with friction material on opposite sides in alternate sectors, that is the pieces of material are arranged in two series staggered with respect to each other.

The above and other objects and features of the invention will be apparent from the following description of the embodiment shown in the accompanying drawings, in which:

Figure 1 is a plan view of the clutch plate.

Figure 2 is a section through the plate on the line 2—2 of Figure 1.

In the arrangement illustrated, an elastic metal plate 10 of dish-like configuration is mounted on a hub 12 having internal splines 14 for keying the plate to a clutch shaft in the usual manner. The plate may be reinforced by corrugations 16, and has an outer flange 18 in a plane substantially perpendicular to the axis of hub 12. Upon each side of flange 18 are arranged a series of pieces of frictional material, those on one side being staggered in relation to those on the other side and with adjacent edges of opposite pieces spaced so as to produce yieldable radial springs between the pads of friction material. Thus, due to the firm clamping action secured by the distortion of the plate when in use by reason of this staggered relation of the pieces of friction material, the clutch operates very efficiently with one-half the usual amount of friction material.

According to an important feature of the invention, and to avoid any tendency of the plate to "set" or become permanently distorted, while at the same time increasing its strength, the periphery of the plate is continuous and unbroken.

While one illustrative embodiment of the invention has been described in detail, it is not my intention to limit its scope to that particular embodiment, or otherwise than by the terms of the appended claim.

I claim:

The clutch plate of resilient material, its outer belt being flat, having a series of frictional pads arranged about each side of the plate near its periphery, the pads on one side being staggered with relation to the pads on the other side, and being of such size as to leave uncovered portions of the plate between adjacent edges of the opposite friction pads.

In testimony whereof I affix my signature.

CLARENCE J. WHITACRE.